United States Patent Office 2,749,645
Patented June 12, 1956

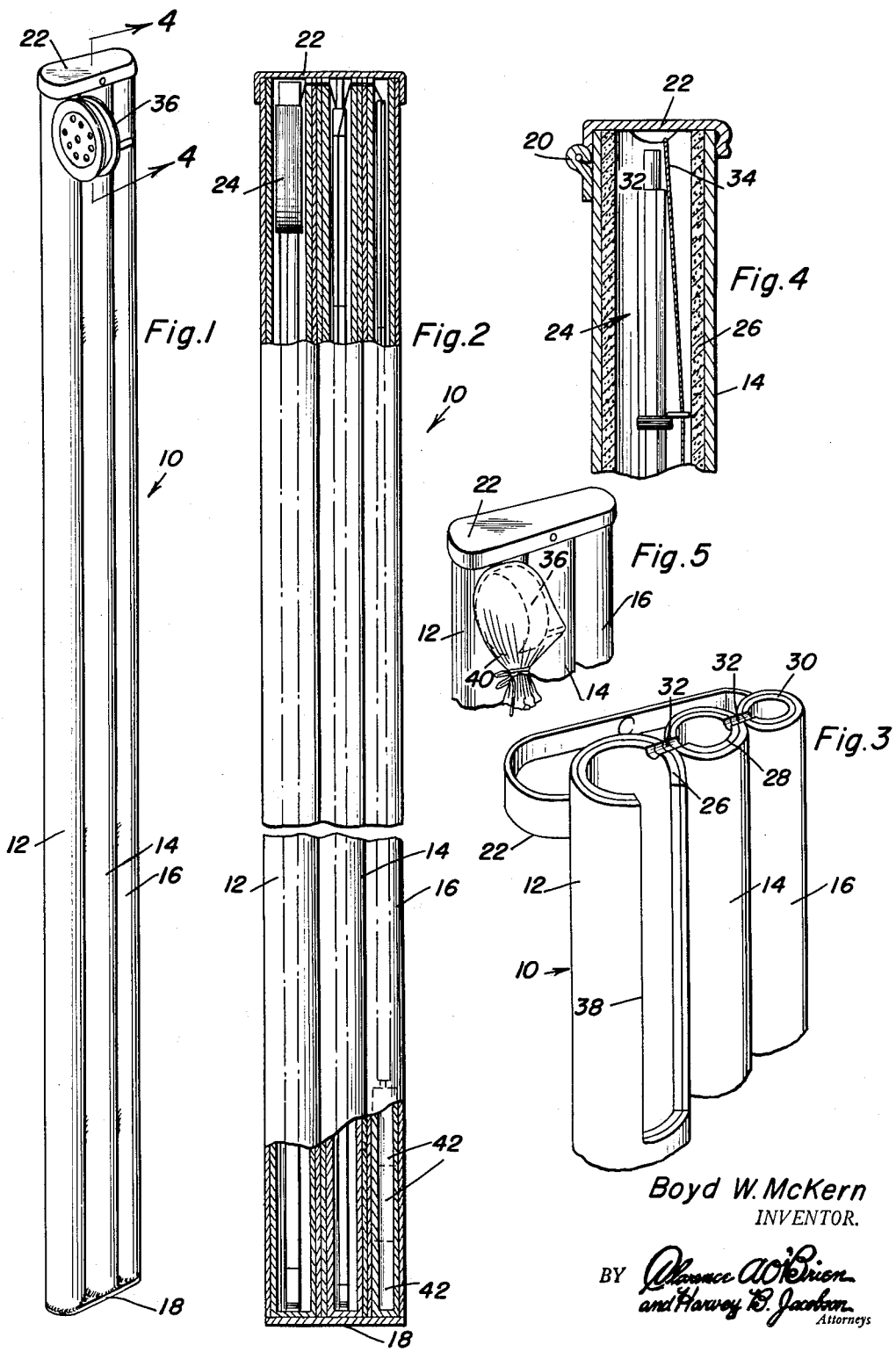
June 12, 1956 — B. W. McKERN — 2,749,645
FISHING GEAR CONTAINER
Filed Sept. 13, 1954
Boyd W. McKern
INVENTOR.

2,749,645

FISHING GEAR CONTAINER

Boyd W. McKern, Bonner County, Idaho

Application September 13, 1954, Serial No. 455,599

2 Claims. (Cl. 43—26)

This invention relates to new and useful improvements in accessories for fishing apparatus, and more specifically to an improved fishing gear container.

At the present time there are many types of containers for fishing rods and reels. However, the construction of these containers is such that it is necessary that the rod be completely disassembled, the reel and line removed from the rod, and the hooks and sinkers removed from the line before the fishing rod can be stored in such containers. It is readily apparent that this results in a relatively great loss of time, inasmuch as each time the fishing rod is to be used, it must be removed from its container and then completely assembled again, after which the reel must be attached thereto, the fishing line threaded through the various guides of the fishing rod, and finally the hooks and sinker re-applied.

It is therefore the primary object of this invention to provide an improved fishing gear container which is such in construction that a rod may be broken down and installed therein with the reel and fishing line still remaining in proper place.

Another object of this invention is to provide an improved fishing gear container in the form of a relatively rigid sectional container, the container being provided with individual sections for receiving the individual sections of a fishing rod and being so constructed whereby there is provided adequate space for the reel and the fishing line.

A further object of this invention is to provide an improved fishing gear container which is so constructed whereby the butt end section of a fishing rod may be stored therein with the fishing reel attached thereto, the fishing gear container being provided with a slot permitting the passage of a base portion of a reel whereby the rod may be retained within the container with the reel positioned exteriorly thereof.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of the fishing gear container which is the subject of this invention and shows the same with a fishing rod installed therein;

Figure 2 is an elevational view of the fishing gear container of Figure 1 with portions thereof broken away and shown in section in order to illustrate the position of the fishing gear disposed therein, intermediate portions of the fishing gear container being broken away and the view being taken on a larger scale;

Figure 3 is an enlarged fragmentary perspective view of the upper end of the fishing gear container of Figure 1 with the cover thereof swung to an out-of-the-way position and the fishing gear removed therefrom;

Figure 4 is an enlarged fragmentary vertical sectional view taken substantially upon the plane indicated by the section line 4—4 of Figure 1 and shows the details of construction of an upper part of one of the sections of the fishing gear container and the relationship of the cover and the fishing gear with respect thereto; and Figure 5 is an enlarged fragmentary perspective view of the upper portion of the fishing gear container of Figure 1 and shows the fishing reel provided with a removable protective cover.

Referring to the drawings in detail, it will be seen that there is illustrated the fishing gear container which is the subject of this invention, the fishing gear container being referred to in general by the reference numeral 10. The fishing gear container 10 includes a plurality of tubular sections 12, 14 and 16 which are disposed in contiguous co-planar parallel relation. The lower ends of the tubular sections 12, 14 and 16 are connected together by a bottom plate 18. Also, the touching parts of the sections are suitably secured together. Hingedly secured to the upper portions of the sections 12, 14 and 16 by a hinge 20 is a cover 22.

As is best illustrated in Figure 3, the sections 12, 14 and 16 decrease in size with the section 12 being the largest section and being intended to have received therein the butt section of a fishing pole, such as a fishing pole which is referred to in general by the reference numeral 24. In order to protect the fishing pole 24 when the various sections thereof are disposed within the fishing gear container 10, the tubular sections 12, 14 and 16 are provided with cushioning linings 26, 28 and 30, respectively, the cushioning liners being preferably formed of cork or other suitable material. The cushioning liners 26, 28 and 30 also have bottom portions, as is best illustrated in Figure 2, so as to protect the ends of the sections of the fishing rod 24. As shown in Figure 3, each of the tubes 12, 14 and 16 is formed by a separate and distinct peripheral wall.

Inasmuch as it is the primary purpose of this invention to provide a fishing gear container which permits the reception of a complete fishing rod assembly therein without removing the reel or the line, the abutting upper portions of the tubular sections 12, 14 and 16 are provided with grooves or notches 32 so that the upper portions of the tubular sections are communicative. The grooves 32 provide suitable clearance for a fishing line 34 carried by the fishing rod 24. Thus, the individual sections of the fishing rod 24 may be disposed in the individual tubular sections 12, 14 and 16 with the fishing line 34 remaining threaded on the fishing rod 24.

In order that a reel, such as the reel 36 carried by the fishing rod 24, may be retained on the fishing rod when inserted in the fishing gear container 10, the forward upper portion of the tubular section 12 is provided with an enlarged opening or slot 38 which opens through the upper end thereof. In this manner, the fishing rod 24 may be disposed in the fishing gear container 10 with the base portion of the reel 36 passing through the opening 38. In order that the reel 36, extending beyond the cap 22, may be protected, there is provided a removable cover 40 for the reel 36, as is best illustrated in Figure 5. The cover or closure cap 22, when closed, closes off the upper open ends of the tubes and also the upper ends of slot 38 and notches 32.

All of the tubular sections of the fishing gear container 10 are of the same length. However, oftentimes the individual sections of a fishing rod are not the same length. Accordingly, the fishing gear container 10 includes suitable spacers 42, as illustrated in Figure 2, for filling up the lower portion of the individual tubular sections, whereby a section of a fishing rod disposed therein will have its upper end disposed adjacent the upper end of the tubular section in which it is disposed and may be easily grasped. Not only that, but shifting of the section within the particular tubular section of the fishing gear container 10 will be prevented.

It is to be understood that the fishing gear container 10 is to be formed of a light weight material in order that the container, together with a fishing rod disposed therein, may be easily transported.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fishing gear container which is such in construction that a conventional sectional rod may be broken down and the sections individually stored and handily carried comprising a plurality of interconnected co-planar parallel tubes closed at their respective lower ends and open at their respective upper ends, there being several tubes for the several complemental sections of the stated fishing rod, each tube providing a compartment for the intended section removably stored therein, said tubes being progressively diminished in cross section, and a single closure cap hingedly mounted on the upper end portion of said tubes and serving to simultaneously close the upper otherwise open ends thereof, adjacent upper end portions of said tubes having aligned clearance notches to accommodate cooperating portions of a fishing line attached to the stated rod, the upper end portion of one of said tubes having a lengthwise slot therein, the lower end of the slot being closed and the upper end of the slot being open and opening through the adjacent upper end of said one tube, said closure cap closing off the upper end of the slot, said slot being adapted to accommodate and permit the passage therethrough of a reel carried by a rod section in said one tube, and said reel extending beyond the closure cap.

2. A fishing gear container which is such in construction that a conventional sectional rod may be broken down and the sections individually stored and handily carried comprising a plurality of interconnected co-planar parallel tubes closed at their respective lower ends and open at their respective upper ends, there being several tubes for the several complemental sections of the stated fishing rod, each tube being formed by a separate and distinct peripheral wall, each tube providing a compartment for the intended section removably stored therein, said tubes being progressively diminished in cross section and defining a first tube which is the largest in cross-section, a third tube which is the smallest in cross section and an intervening central tube which is of proportional cross-section, the upper end of the central tube having a pair of diametrically opposite line accommodating and clearance notches and the adjacent wall portions of the first and third tubes each having a single notch aligned with the adjacent single notch of said central tube, and a single closure cap mounted on the upper end portions of said tubes serving, when closed, to not only close the otherwise open upper ends of the tubes but all of said line clearance notches.

References Cited in the file of this patent

UNITED STATES PATENTS

| | | |
|---|---|---|
| 396,702 | Loftie | Jan. 22, 1889 |
| 566,903 | Gieschen | Sept. 1, 1896 |
| 599,370 | Streator | Feb. 22, 1898 |
| 803,325 | Brennaaun | Oct. 31, 1905 |
| 2,573,431 | Gibson | Oct. 30, 1951 |
| 2,650,449 | Suring | Sept. 1, 1953 |